(12) United States Patent
Karwacki et al.

(10) Patent No.: US 7,537,648 B1
(45) Date of Patent: May 26, 2009

(54) FILTER SERVICE LIFE ESTIMATOR

(75) Inventors: Christopher J. Karwacki, Churchville, MD (US); Gregory W. Peterson, Abingdon, MD (US); Yuqing Ding, Perry Hall, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 472 days.

(21) Appl. No.: 11/411,679

(22) Filed: Apr. 26, 2006

(51) Int. Cl.
*F24F 13/00* (2006.01)
*G01P 13/00* (2006.01)

(52) U.S. Cl. .............................. 96/416; 96/417; 96/424; 96/414; 96/421; 96/117; 96/117.5; 55/471; 55/DIG. 34; 116/DIG. 25

(58) Field of Classification Search .................. 96/416, 96/417, 424, 414, 421, 117, 117.5; 55/471, 55/DIG. 34; 116/DIG. 25
See application file for complete search history.

(56) References Cited

U.S. PATENT DOCUMENTS

| | | | |
|---|---|---|---|
| 2,746,416 A * | 5/1956 | Aufderheide | ................ 116/275 |
| 3,635,001 A * | 1/1972 | Komroff et al. | ................ 96/417 |
| 6,315,821 B1 * | 11/2001 | Pillion et al. | ................ 96/416 |
| 6,508,868 B2 * | 1/2003 | Pillion et al. | ................ 96/416 |
| 6,800,106 B2 * | 10/2004 | Cogar et al. | ................ 55/385.6 |
| 6,979,361 B2 * | 12/2005 | Mihayiov et al. | ................ 96/26 |
| 7,001,451 B2 * | 2/2006 | Kim | ................ 96/415 |

FOREIGN PATENT DOCUMENTS

FR 2611068 A1 * 2/1987 .................. 434/106

* cited by examiner

*Primary Examiner*—Jason M Greene
*Assistant Examiner*—Ming-Chau T Pham
(74) *Attorney, Agent, or Firm*—Ulysses John Biffoni

(57) ABSTRACT

A mechanical device is used to estimate a service life of an air filter exposed to a certain chemical at various concentrations, flow rates, and relative humidity conditions. The device includes two members, one of which has at least one window, connected so that their surfaces are movable relative to one another. One member has numerical values for chemical concentrations and service life estimates printed on it. The member having windows has at least one mark printed on it by which it can be oriented relative to the chemical concentration scale on the other member. When the two members are aligned relative to a chemical concentration of interest, the corresponding service life estimate is displayed in an appropriate window.

20 Claims, 5 Drawing Sheets

FILTER SERVICE LIFE ESTIMATOR

GOVERNMENTAL INTEREST

The invention described herein may be manufactured, used and licensed by or for the U.S. Government.

TECHNICAL FIELD

This invention relates to protective air filters designed to prevent inhalation of certain chemicals and, more particularly, to a mechanical device that can be used to calculate the effective service life of protective air filters exposed to specific chemicals at various concentrations, flow rates, and relative humidity conditions.

BACKGROUND

Workers in certain hazardous professions, such as emergency rescue workers and military personnel, may in certain circumstances be exposed to various chemicals, the inhalation of which can be irritating, health-threatening, or even life-threatening. Members of those professions have benefited from the development of a variety of air filter canisters designed to be used in conjunction with a protective breathing apparatus so as to reduce or eliminate specific chemicals of concern from breathable air, and thus limit or prevent inhalation of such chemicals.

Air filters have a finite capacity to effectively remove chemicals from breathable air, and consequently a single filter can adequately protect its user from a chemical threat for only a certain amount of time, after which it must be replaced with a new filter. The amount of time that a single filter remains effective is referred to as its service life. The effective service life of a filter is variable, depending on a number of factors, including the type of chemical it is designed to protect against, the concentration of the chemical to which it is exposed, the flow rate of air through the filter, and relative air humidity conditions.

Currently, the service life of a given air filter can generally be estimated only by manual reference to compiled data tables or by computer simulation. These methods have various drawbacks and disadvantages. For example, in the case of first responders in emergency or military situations, they are likely to be under extreme time pressure and must keep their hands free. In such cases, manual lookup tables can be bulky, confusing, and time consuming, while computer hardware is not always available and can be easily damaged.

Accordingly, there is a need for a device and method that can be used to quickly and conveniently estimate the service life of an air filter under various conditions.

SUMMARY

A mechanical device according to the present invention provides a compact and convenient means for estimating an air filter service life.

The device includes two members, the first having a scale of chemical concentrations and filter life estimates printed upon it, and the second having at least one window or other indicator for viewing, highlighting, designating, or otherwise indicating one or more of the filter life estimates printed on the first member. The second member also has at least one pointer or other mark disposed on it which can be positioned relative to a location on the scale of chemical concentrations printed on the first member. The two members are operably connected such that the first member can be moved relative to the second member, and oriented such that filter life estimates printed on the first member can be viewed through the window or otherwise designated by the indicator of the second member.

According to one aspect of the invention, the orienting mark or marks are printed on the second member and permit a user to position the second member relative to a chemical concentration value of interest printed on the first member. When so positioned, multiple filter life estimates appropriate for the selected chemical concentration appear in the window or windows of the second member. Additional reference marks on the second member pertaining to, for example, variable air flow rates and relative humidity conditions allow the user to further distinguish between multiple service life estimates so displayed.

In another aspect of the invention, the members are rigid plastic planar discs. The discs are concentrically aligned and connected by a fastening device, such as a rivet, such that the discs can rotate relative to one another. The material from which the members are made is not critical, as the same functionality can be achieved using paper, cardboard, plastic, or metal. Likewise, the shape of the members is not critical, as shapes other than planar discs could also be used to achieve the same result.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a top plan view of one embodiment of the device of the present invention FIG. 2 is an exploded perspective view of the device of FIG. 1;

Like reference symbols in the various drawings indicate like elements.

DETAILED DESCRIPTION

Figure 1:
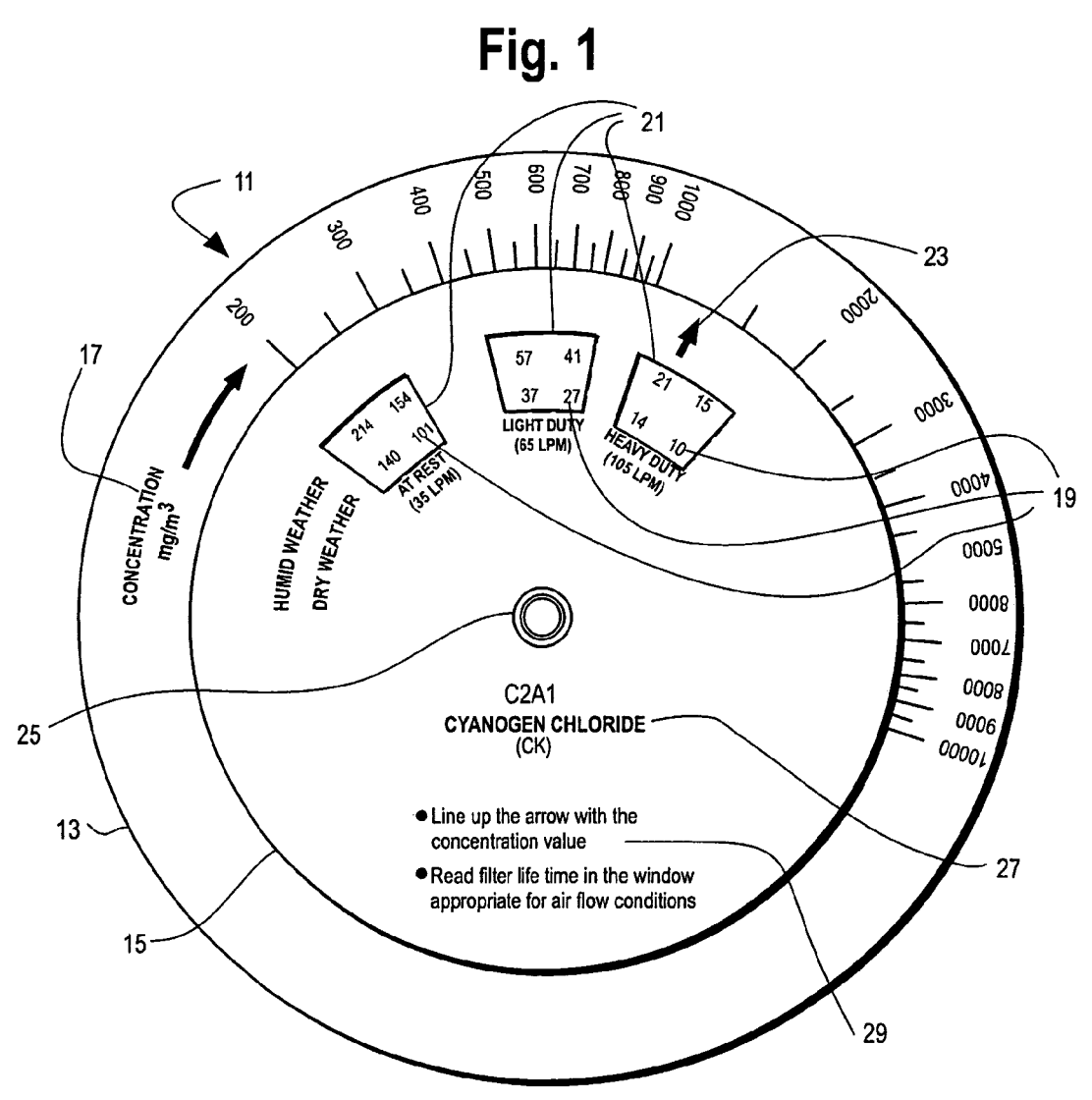
Figure 2:
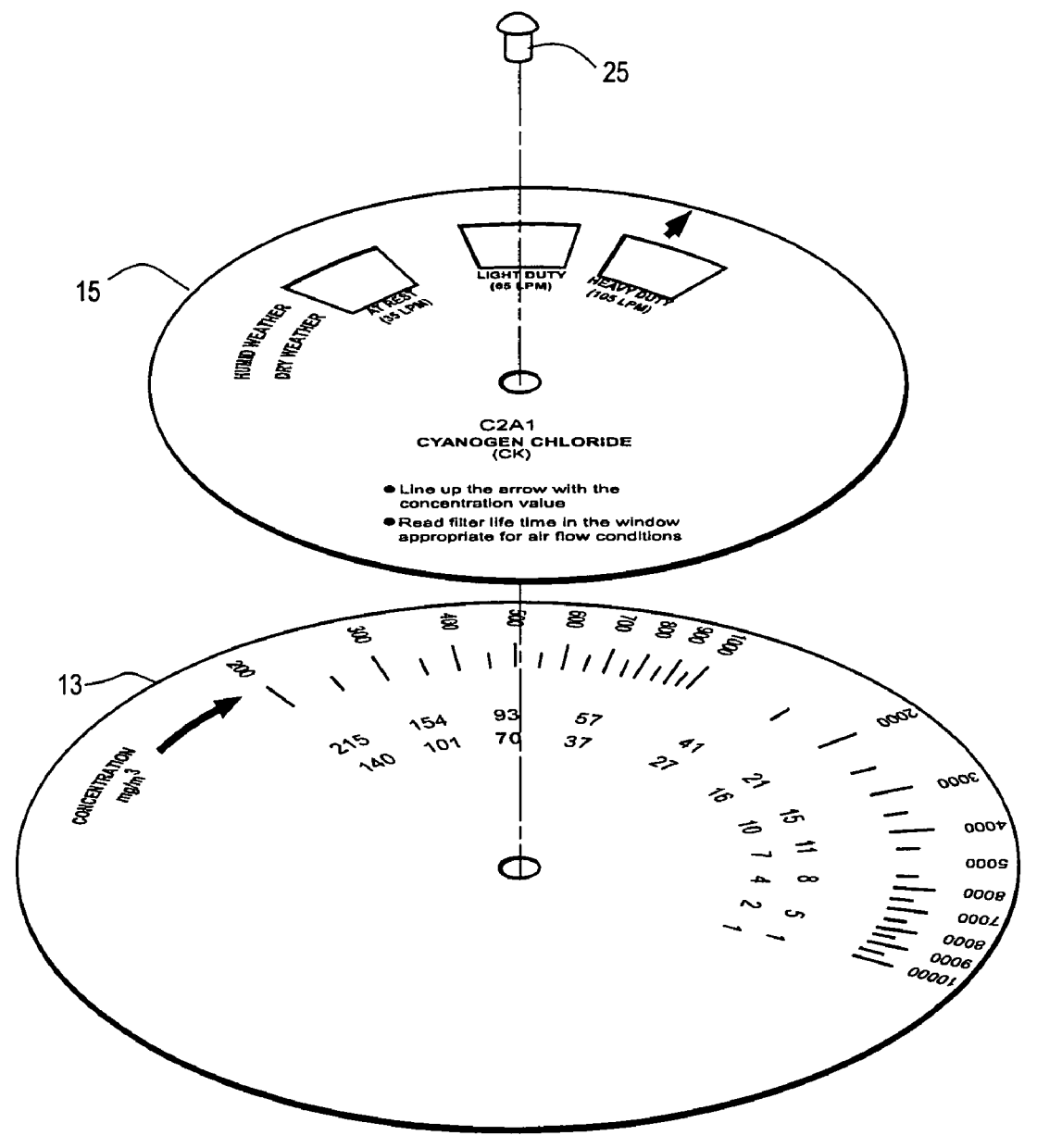
Figure 3:
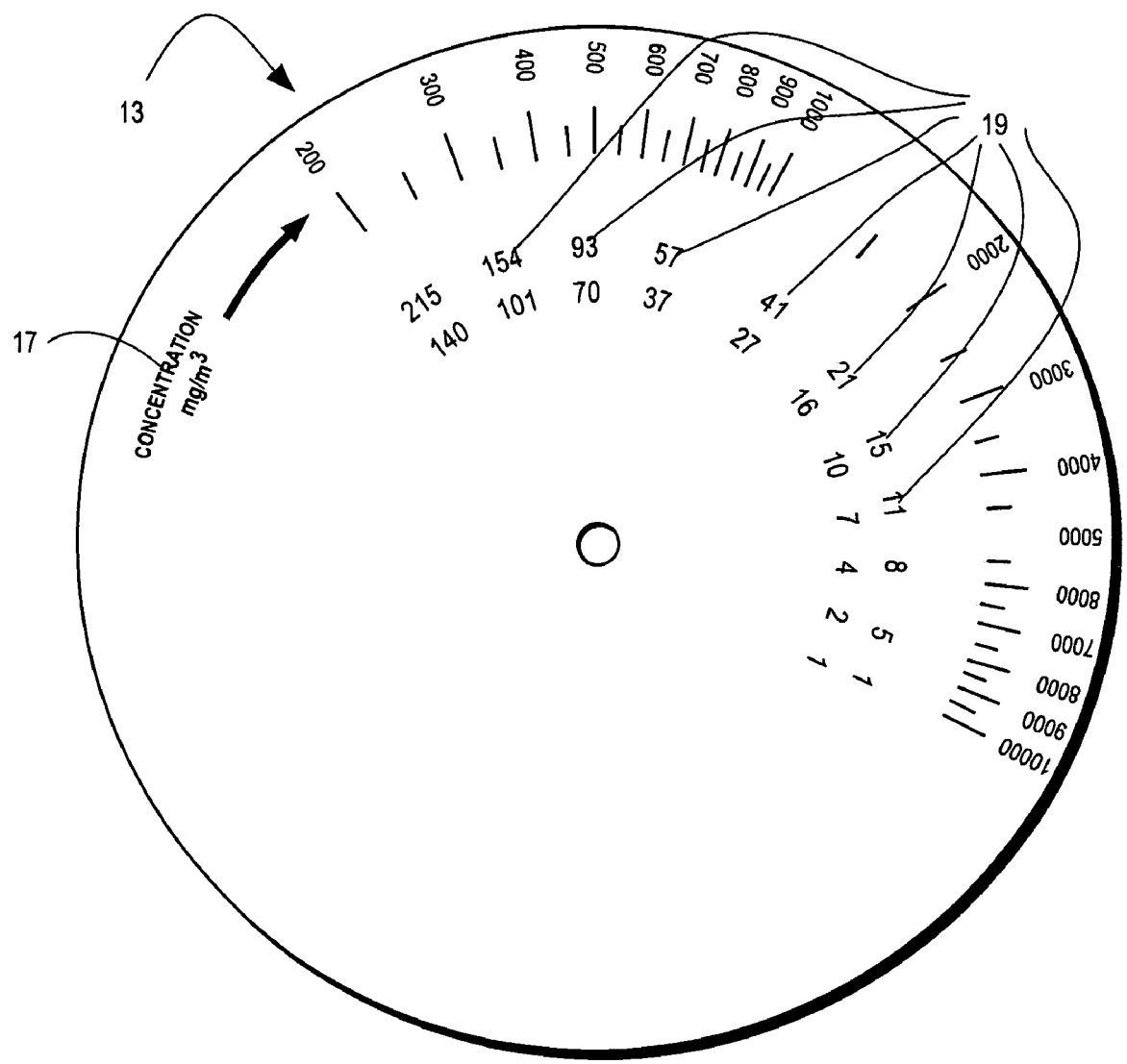
FIG. 3 is a top view of the first member of FIG. 1.

Referring to FIGS. 1-4, one implementation of a mechanical device 11 includes a first member 13 and a second member 15. The two members 13, 15 are adapted to be positioned relative to one another to indicate a filter life estimate, for any of a variety of different chemicals or filters, corresponding with various chemical concentrations, air flow rates, and relative humidity conditions. A scale of chemical concentrations 17 and associated filter life estimates 19 are printed on the first member 13. The second member 15 has at least one window 21 and at least one mark 23 adapted to be positioned relative to a desired value on the scale of chemical concentrations 17 printed on the first member 13. When so positioned, window 21 allows the user to view at least one filter life estimate 19 calculated for the designated chemical or filter.

The general structure of the device 11 can be adapted for use with any one of a wide variety of distinct chemicals of concern or commercially available filter canisters, or any combination of said chemicals and filter canisters. Such chemicals include, but are not limited to, carbon disulfide, chloropicrin, cyanogen chloride, cyclohexane, dimethylmethylphosphonate, formaldehyde, hydrogen chloride, hydrogen cyanide, methyl mercaptan, nitrogen dioxide, phosgene, and sulfur dioxide. Such filter canisters include, but are not limited to, the C2, C2Al, 3M FR57, 3M FR64, Scott NBCvA, SEA ABEK3HE-DP-T/ABEK3HE-DP-TH, and SEA ABEKP100-CBRN-T filter canisters.

In this embodiment, first member 13 and second member 15 are resilient plastic planar discs, concentrically configured, and operably connected by means of a fastening device 25, such as a rivet. The connection permits free rotation of at least one of the planar discs relative to the other.

A scale of chemical concentrations 17 in $mg/m^3$ and associated filter life estimates 19 in minutes are printed on the first member 13. Points on the scale of chemical concentrations and discrete filter life estimates are spatially configured on the first member in relation to one another, such that the position of one or more filter life estimates corresponds with the position of the chemical concentration value for which the filter life estimate was calculated. The first member 13 may be adapted for use with a variety of different chemicals or filters by employing corresponding filter life estimates 19 calculated for the designated chemical or filter.

Second member 15 has three windows 21, a mark 23 adapted to be positioned relative to a desired value on the scale of chemical concentrations 17 printed on first member 13, a label or other indicia 27 that describe the filter or the chemical (or both) for which the device is designed to provide a filter life estimate, and instructions 29 for using the device. The three windows 21 of the second member 15 correspond with three air flow rates labeled, respectively, "AT REST (35 LPM)," "LIGHT DUTY (65 LPM)," and "HEAVY DUTY (105 LPM)." Two relative humidity designations, "HUMID WEATHER" and "DRY WEATHER," are printed along the radial axis of the window labeled "AT REST (35 LPM)." The term "mark" when used herein applies not only to any form of pointing or indicating indicia, but also to any suitable structure, pointer, notch, line, or other means for aligning, pointing, or indicating a location or relative position.

Figure 4:
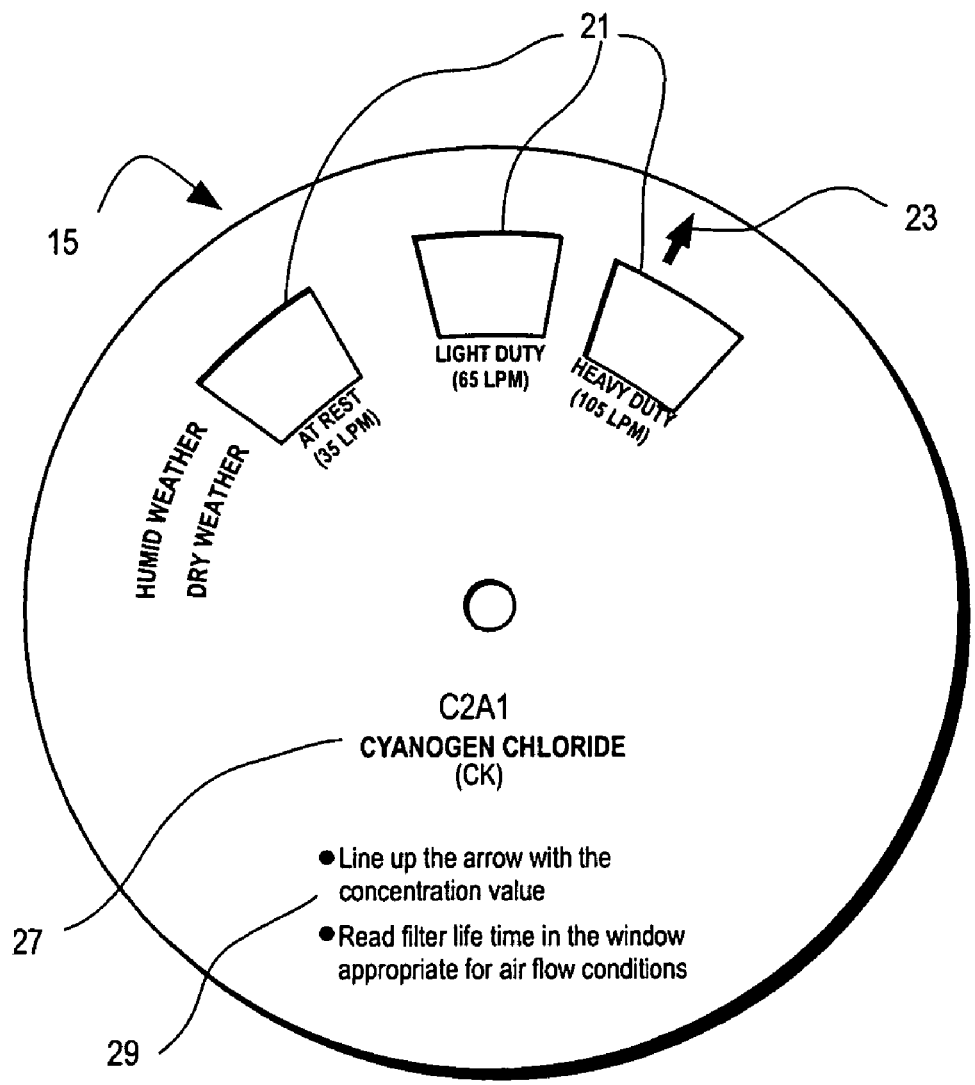
FIG. 4 is a top view of the second member of FIG. 1.

As best seen in FIG. 1, when the second member of FIG. 4 is operably connected with the first member of FIG. 3, air filter service life estimates 19 for varying relative humidity conditions and varying air flow rates can be viewed through the windows 21 of the second member 15. When the second member 15 is rotated with respect to the first member 13 such that the mark 23 of the second member 15 is aligned with a desired value on the scale of chemical concentrations 17 printed on the first member 13, filter life estimates 19 appropriate for the selected chemical concentration will be displayed in each of the windows 21 of the second member 15. One or more filter life estimates are selected from the window 21 corresponding with a selected air flow rate by reference to the appropriate relative humidity designations. In this embodiment, for each humidity designation and each window, the filter life estimate includes two values corresponding to a range of time expressed in minutes.

Members 13, 15 may be formed of any of a wide variety of materials capable of assuming a planar form. Paper, cardboard, plastic, metal, and the like are suitable, as are laminates or composites of the foregoing. Selection of suitable materials may depend on the environment or environments intended for use of the device. Thus, for example, harsh environments may require more robust or fireproof construction, and the material chosen preferably is not affected by exposure to the chemical or chemicals likely to be encountered during use of the device.

Figure 5:
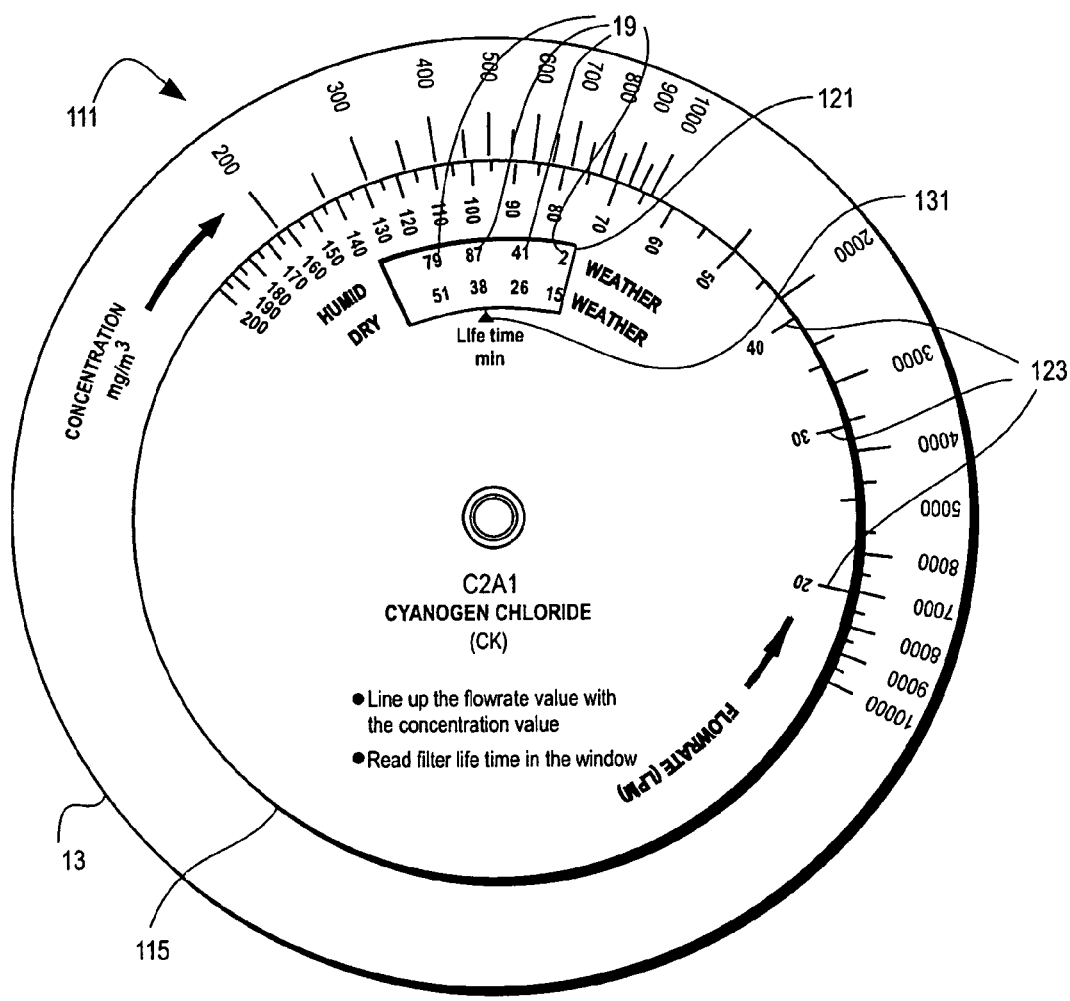
FIG. 5 is a top plan view of a second embodiment of the present invention.

A second embodiment, shown in FIG. 5, is similar to the embodiment of FIGS. 1-4, in that it makes use of two discs that rotate relative to one another. Likewise, the first member 13 of device 111 is substantially the same as in the previous embodiment. In this embodiment, however, device 111 has an array of marks 123 disposed on second member 115 at its perimeter. Marks 123 correspond to a scale of air flow rates in LPM and are adapted to be positioned relative to a desired value on the scale of chemical concentrations 17 printed on first member 13. Also, in this embodiment, the second member 115 has one window 121 and a mark or indicium 131 in close proximity to the perimeter of the window 121 adapted to designate a specific spatial position inside the window 121. As in the previous embodiment, a label or other indicia 27 that describe the filter or the chemical (or both) for which the device is designed to provide a filter life estimate and instructions 29 for using the device are printed on the second member 115, and two relative humidity designations, "HUMID WEATHER" and "DRY WEATHER," are printed along the radial axis of the window 121.

When second member 115 is operably connected with first member 13, air filter service life estimates 19 for varying relative humidity conditions and varying air flow rates can be viewed through the window 121 of second member 115. When second member 115 is rotated with respect to first member 13 such that a mark 123 corresponding to one of the flow rate values on second member 115 is aligned with a desired value on the scale of chemical concentrations 17 printed on first member 13, filter life estimates appropriate for the selected chemical concentration and flow rate will be displayed in the window 121 of the second member 115. An accurate filter life estimate can be selected by reference to the appropriate relative humidity designation and by further reference to the mark or indicium 131 used to designate a position inside the window 121.

Other embodiments are within the scope of the present invention and claims. For example, instead of using disc-shaped members, device 11, 111 may use rectangular members, such as bars, or cylindrical members, which members slide relative to each other and operate as a slide rule. Connected planar members other than discs are likewise suitable, such as semicircular or octagonal members. As a further alternative, filter life estimates could be expressed as single discrete values, or as a single value with a standard deviation, rather than the two values representing a range discussed previously.

Windows 21, 121 can assume any number of shapes or forms adapted to allow a user to focus on one or more values rather than other values printed on the first member 13. So, for example, windows 21, 121 may be defined not only as holes, slots, or other empty spaces cut out of a member, but also as a transparent, translucent, or color-contrasting portion of a member. Likewise, device 11, 111 can be provided with any other type of indicator of filter service life, such indicators including windows, frames, lines, or other structures or means for viewing, highlighting, designating, or otherwise indicating one or more service life estimates 19 printed on the first member 13.

The arrangement of the scale of chemical concentrations 17; the size, location, and quantity of windows 21, 121; and the location of other related marks or indicia 23, 123, 131, as well as the values of filter life estimates 19 can be varied to suit particular applications or environments. Similarly, the relative positioning of the indicia on each of the members, or even the positions of indicia on one member relative to indicia on the other member, can be varied to accomplish the purposes of this invention. Therefore, the appended claims are to be construed to cover equivalent structures.

What is claimed is:

1. A device for estimating an air filter's service life comprising:

a first member having a scale of chemical concentrations and a plurality of service life estimates disposed thereon;

a second member operably connected to the first member, the second member having at least one mark adapted to be positioned relative to a desired value on the scale of chemical concentrations on the first member; and means for indicating at least one service life estimate on the first member when the mark on the second member is positioned relative to the desired value on the scale of chemical concentrations on the first member.

2. The device of claim 1, wherein the members are substantially planar.

3. The device of claim 2, wherein the members are discs.

4. The device of claim 1, wherein the means for indicating at least one service life estimate includes a window formed in the second member.

5. The device of claim 1, wherein the means for indicating at least one service life estimate includes a plurality of windows formed in the second member.

6. The device of claim 5, wherein the windows are arcuately spaced on the second member.

7. The device of claim 6, wherein a plurality of the service life estimates are disposed relative to each of the windows to be simultaneously visible and correspond to service life estimates under different respective humidity conditions and different respective air flow rates.

8. The device of claim 1, wherein the second member has a scale of flow rates thereon, a desired one of the flow rates being positionable relative to a desired value on the scale of chemical concentrations on the first member.

9. The device of claim 1, wherein the service life estimates are disposed relative to the indicating means to indicate a single numerical value.

10. The device of claim 1, wherein the service life estimates are disposed relative to the indicating means to indicate a range between two numerical values.

11. A hand-held, portable device for estimating an air filter's service life comprising:

a first disc having a scale of chemical concentrations and a plurality of service life estimates printed thereon; and a second disc having at least one window and at least one mark adapted to be positioned relative to a desired value on the scale of chemical concentrations printed on the first disc when at least one of the discs is rotated, wherein:

the first and second discs are operably connected such that the discs are concentric and can be rotated relative to one another;

the first and second discs can be positioned relative to one another by reference to at least one point on the scale on the first disc and at least one mark on the second disc; and when the two surfaces are aligned by reference to the desired value on the scale of chemical concentration, at least one corresponding service life estimate is visible in the window.

12. The device of claim 11 wherein the first disc has two rows of service life estimates printed thereon, corresponding with relatively humid humidity conditions and relatively dry humidity conditions.

13. The device of claim 11 wherein the second disc has a single window and a scale of air flow rates by which to position the second disc relative to the first disc printed thereon.

14. The device of claim 11 wherein the second disc has three windows corresponding with three air flow rates and a single mark by which to position the second disc relative to the first disc.

15. A method for calculating an air filter service life estimate comprising:

estimating a concentration of a chemical challenge; and aligning first and second members of a device as a function of the estimated concentration of the chemical challenge, the first member of said device having a scale of chemical concentrations and a plurality of filter life estimates disposed thereon, whereby at least one air filter service life estimate is indicated by the second member of said device.

16. The method of claim 15 wherein the air filter service life estimate is selected from at least two values indicated by further reference to indicia corresponding to flow rates of air through the air filter and relative humidity conditions.

17. The method of claim 15 wherein the members of the device are aligned by reference to a scale of chemical concentrations disposed on the first member of said device and a scale of flow rates of air through the air filter disposed on the second member of said device.

18. The method of claim 17 wherein an air filter estimate is selected from at least two ranges indicated by further reference to relative humidity conditions.

19. A method of calculating an air filter service life estimate for a chemical challenge, the method comprising:

moving indicia disposed on a first surface relative to indicia disposed on a second surface, the indicia corresponding to concentration of the chemical challenge, flow rates of air through the air filter, relative humidity conditions, and filter service life estimates; and aligning the indicia in accordance with the concentration of the chemical challenge to indicate at least one corresponding air filter service life estimate disposed on one of the surfaces.

20. The method of claim 19 in which the surfaces are overlapping, substantially planar discs and at least some of the indicia are disposed about the circumference of one of the discs, wherein:

the step of moving the surfaces includes rotating the discs relative to one another; and the step of aligning the indicia includes positioning a mark on one of the discs proximate to a corresponding concentration of the chemical challenge to indicate at least one corresponding air filter service life estimate.

* * * * *